Jan. 19, 1937.　　G. H. ACKER　　2,068,391
LUBRICATING SYSTEM
Filed Aug. 3, 1933　　5 Sheets-Sheet 1

INVENTOR.
George H. Acker
BY
Fay, Oberlin & Fay
ATTORNEYS.

INVENTOR.
George H. Acker
BY
Fay, Oberlin & Fay
ATTORNEYS.

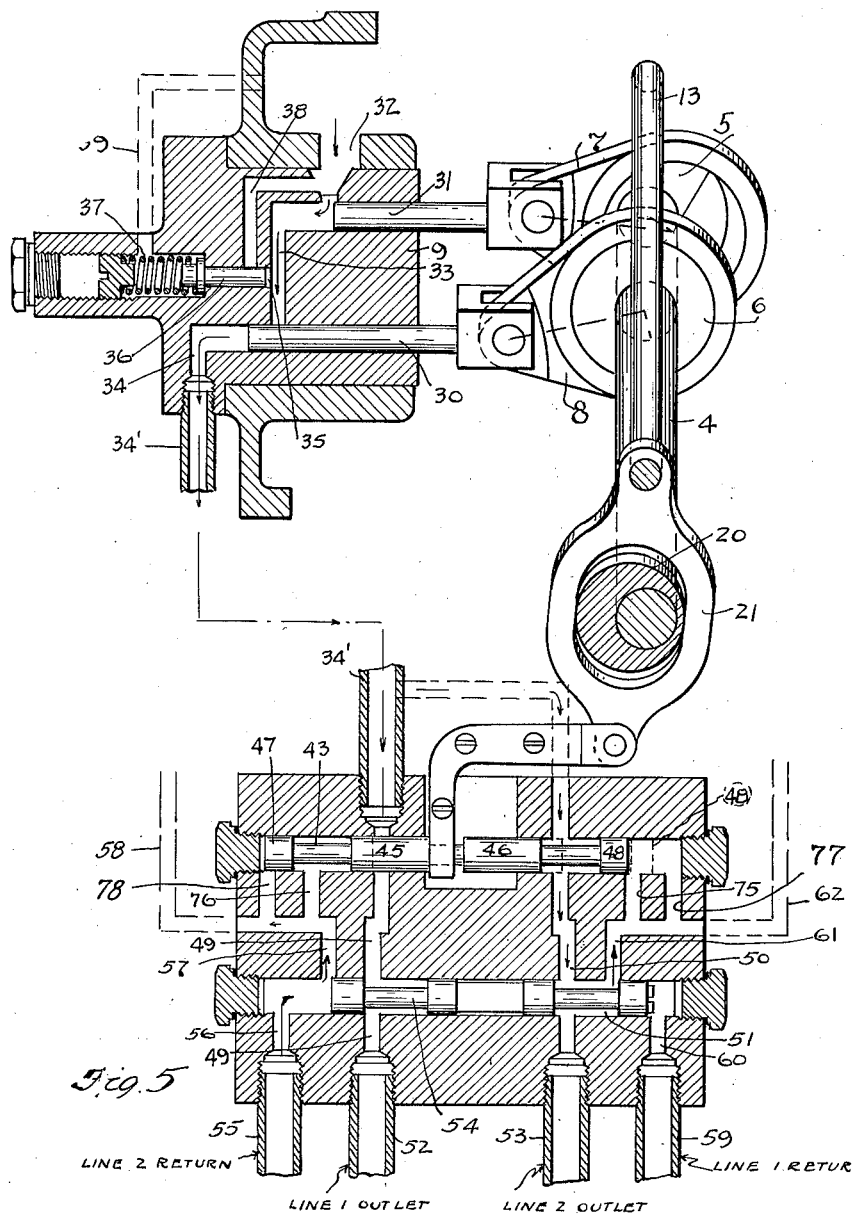

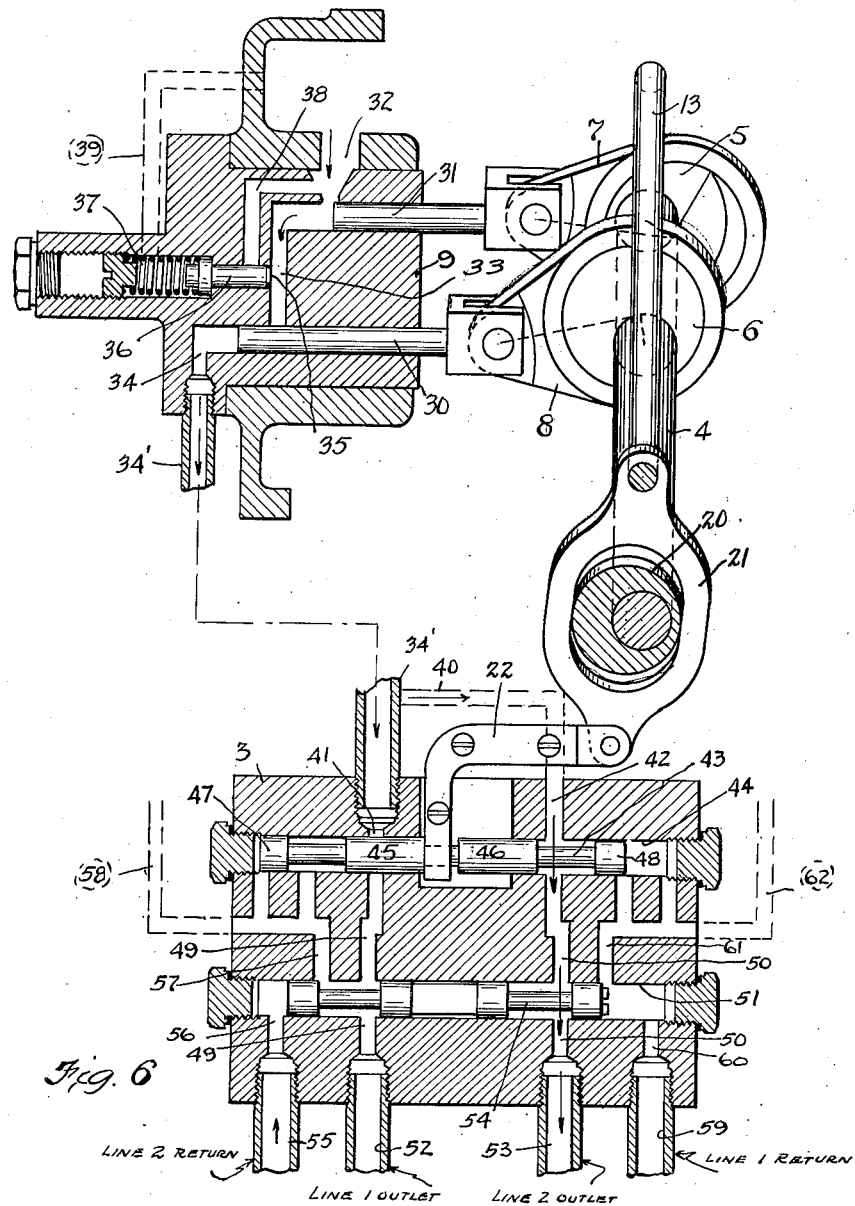

Patented Jan. 19, 1937

2,068,391

UNITED STATES PATENT OFFICE 2,068,391

LUBRICATING SYSTEM

George H. Acker, Shaker Heights, Ohio, assignor to The Farval Corporation, Cleveland, Ohio, a corporation of Ohio Application August 3, 1933, Serial No. 683,501

14 Claims. (Cl. 184—7)

The present invention relating as indicated to a lubricating system has more particular reference to the provision of a novel form of lubricant flow and pressure control apparatus best adapted for installation with a dual line type of lubricating system. Such a dual line type of system primarily consists of two feed lines which are connected to the various lubricating valves and a main control device for alternately and automatically reversing the direction of flow of the lubricant in such lines. Such a dual line type of system is set forth and described in detail in the copending application of Clarence R. Burrell, Serial No. 603,590, filed April 6, 1932.

In the construction of a dual line type lubricating system, it has been found necessary that the following main elements be provided: A lubricant reservoir, a pressure pump, a double conduit, distribution line valves, a flow reverser, and a flow resistance. The present invention pertains primarily to only three of these elements, namely, the pressure pump, the flow reverser, and the flow resistance.

Generally, it is the object and nature of this invention to provide a single, compact unit, automatic in operation, which will embody the three last-named elements in conveniently assembled form possessing a maximum of durability and operative efficiency, and occupying a minimum of space. Various other objects and advantages of the invention will become apparent as the description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
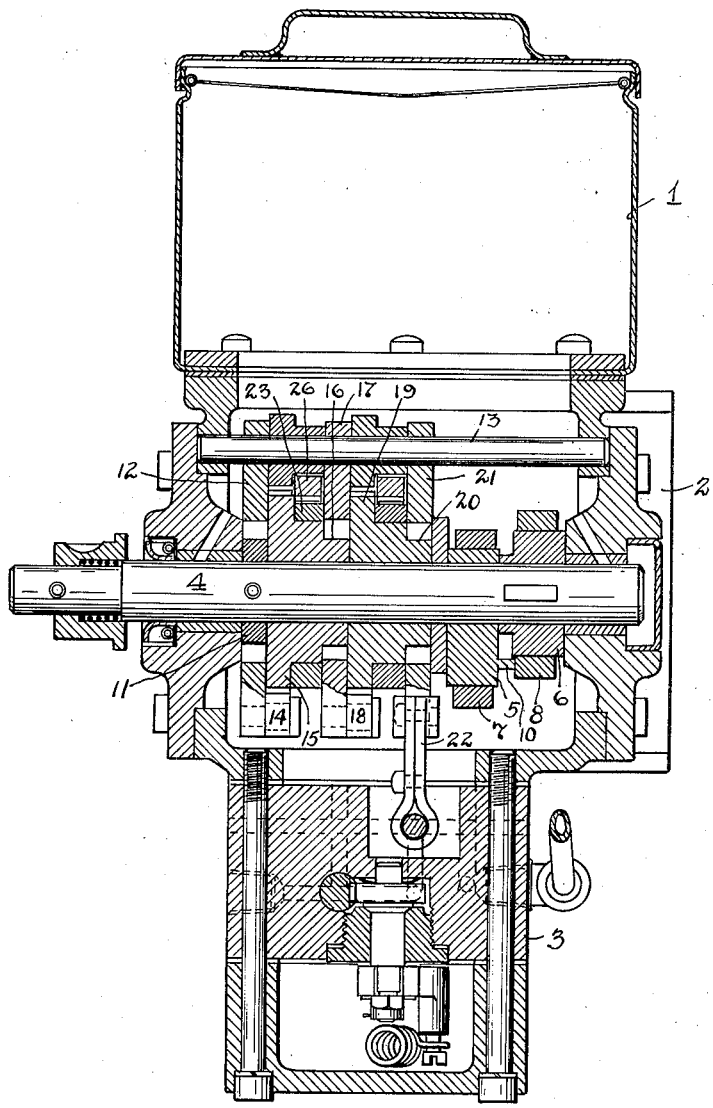
Figure 2:
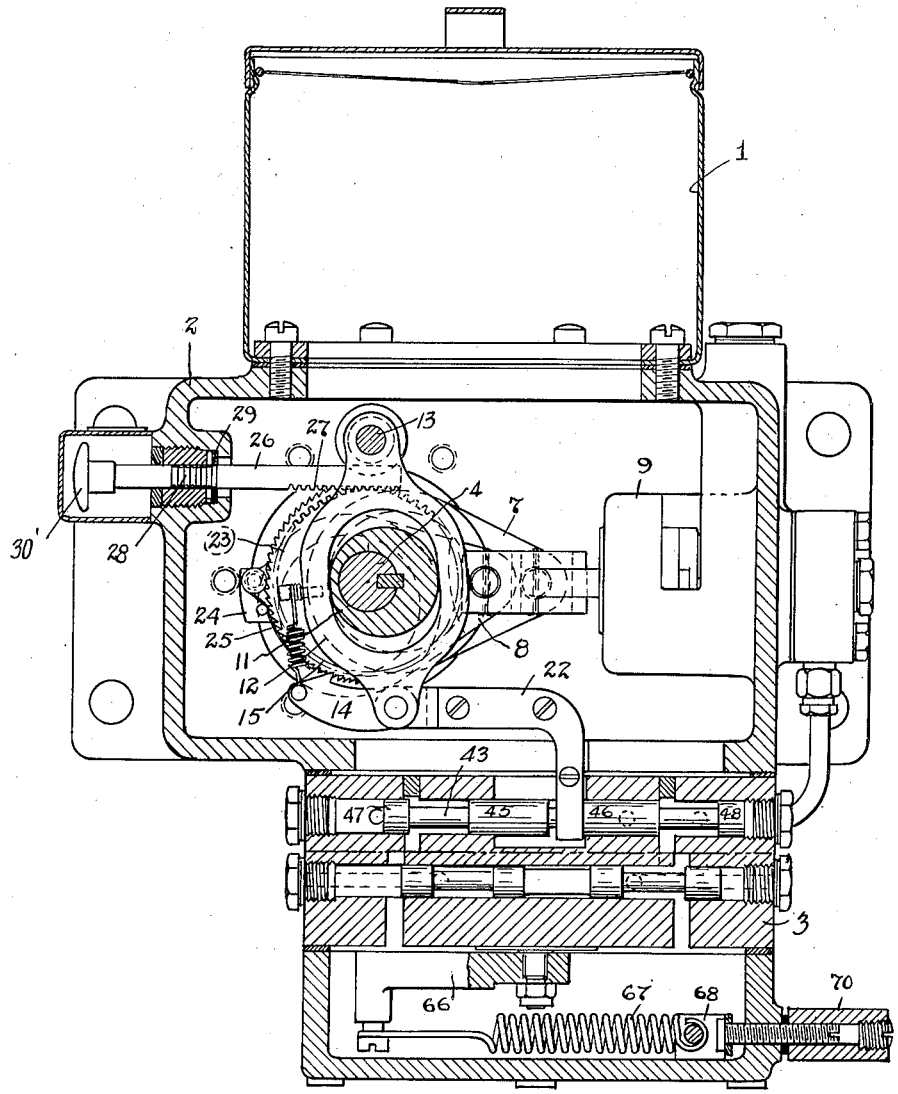
Figure 3:
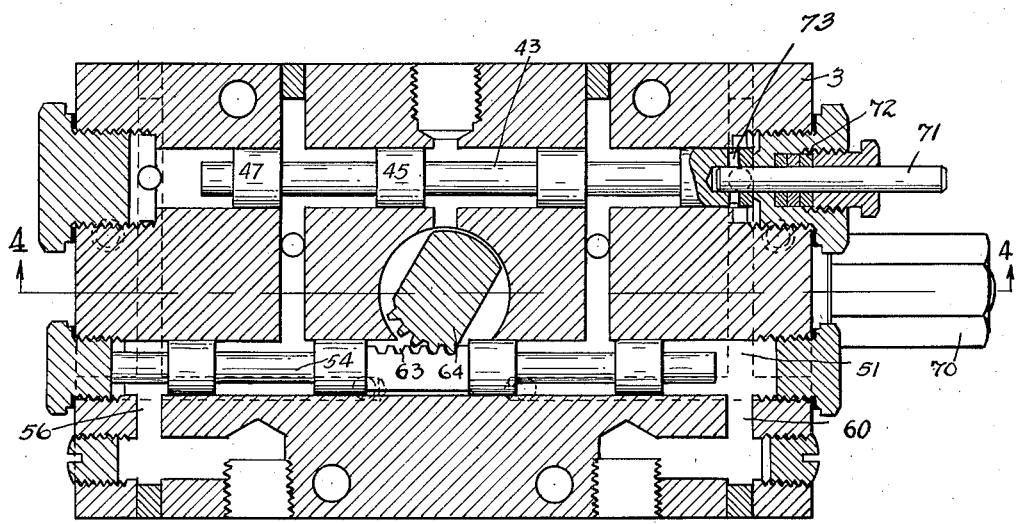
Figure 4:
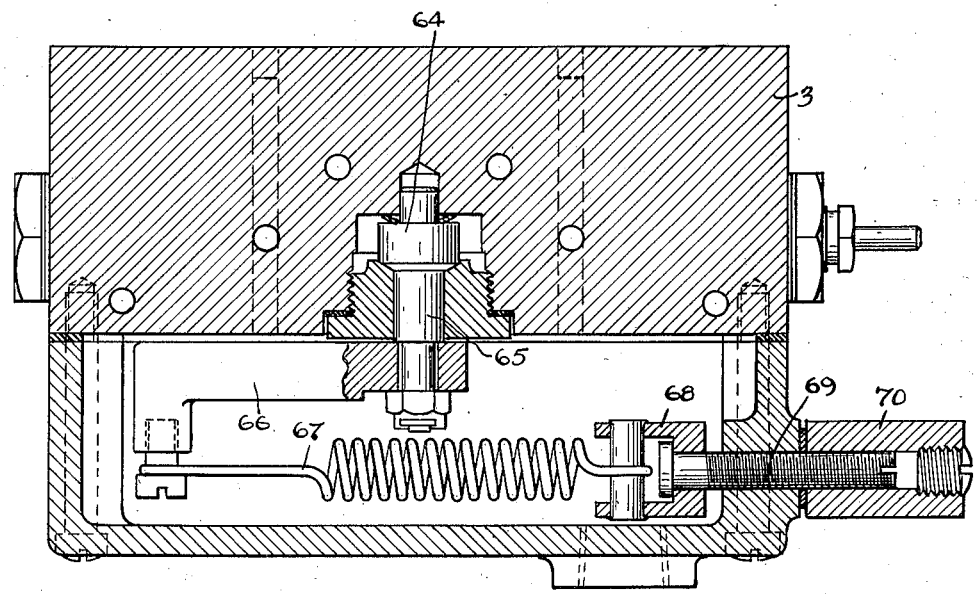

In said annexed drawings:

Fig. 1 is a sectional assembly view of the apparatus embodying the principle of my invention; Fig. 2 is another sectional view of the apparatus shown in Fig. 1, but taken upon a plane normal thereto; Fig. 3 is a section taken through the control valve body; Fig. 4 is another section of the control valve body and taken substantially along the line 4, 4 of Fig. 3 and in the direction of the arrows; Figs. 5 and 6 are schematic sectional views illustrating different operative positions of the pressure pump and control valve.

Now referring more particularly to Figs. 1 and 2, the apparatus shown therein consists primarily of a lubricant reservoir indicated generally by the numeral 1, the timing and pump driving mechanism housing indicated generally by the numeral 2, and the control valve housing 3. It will be noted that the above-mentioned elements are positioned one below the other, in closely fitting relationship in order to present an extremely compact assembly. The detailed construction of the timing and pressure pump driving mechanism and the control valve assembly will now be described.

Timing and pressure pump drive mechanism

Directing attention to Figs. 1 and 2, a centrally disposed shaft 4 is suitably journaled within the housing 2. The prime moving element such as an electric motor (not shown) may be drivably connected to the shaft 4. A pair of eccentrics 5 and 6 carrying their respective followers 7 and 8 are mounted on the shaft 4. The last-named eccentrics and followers are for the purpose of actuating the pistons of the pressure pump, whose housing is indicated generally by the numeral 9.

On the left portion of the shaft 4 (looking at Fig. 1) there is mounted an eccentric 11. An oval-shaped follower 12 surrounds the eccentric 11 and is pivotally fixed at its upper end to the shaft 13. Upon the lower end of the follower 12, there is positioned a pawl 14 which in turn is adapted to engage with the serrated periphery of the ratchet 15. The ratchet 15 is made integral with another eccentric surface 16, and both are rotatably mounted upon the shaft 4. A second oval shaped eccentric follower 17 carrying the pawl 18 contacts with the periphery of the eccentric 16. The pawl 18 in turn engages with the periphery of the ratchet 19. Similar to the construction just described, the third eccentric 20 contacts with the oval-shaped follower 21. The upper ends of the eccentric followers 17 and 21 are also pivotally fixed to the shaft 13. The lower end of the eccentric follower 21 is connected to the main control valve by means of an L-shaped connecting arm 22.

Means for variably regulating the degree of engagement of the above-described pawls upon their respective ratchet wheels are provided. Inasmuch as both of these means are identically the same in construction, for the purposes of expediency, only one will be herein described. An annular collar 23 is rotatably mounted between the ratchet 15 and the eccentric 16. A lug 24 extends from the outer periphery of the collar 23 and carries a thin strip 25 which overlies the outer ends of the teeth on the periphery of the ratchet wheel 15. A bar 26 has a gear rack 27 upon its inner end which is in turn adapted to engage with gear teeth on the outer periphery of the collar 23. The medial portion of the bar 26 is formed with a plurality of grooves 28 which are adapted to be engaged by suitable resilient detent such as a wire spring 29. A manipulating knob 30' is placed upon the outer end of the bar 26.

It will thus be seen that movement of the bar 26 inwardly or outwardly of the housing 2 will in turn tend to rotate the collar 23 about the shaft 4 and also vary the peripheral position of the flat strip 25 with respect to the ratchet wheel 15. The position of the lower end of the flat strip 25 will determine the point at which the pawl 14 will engage with the ratchet wheel 15. In this manner it is possible to variably regulate the number of teeth which the pawls 14 and 18 will engage of their respective ratchets upon the reciprocal movement of the eccentric followers.

A more complete analysis of the above-described apparatus will disclose the fact that the series of eccentrics and followers serve as means for adjustably regulating the rate of rotation of the final eccentric 20 of the series and, accordingly, the period of reciprocation of the eccentric follower 21 with respect to the rate of rotation of the drive shaft 4.

As best shown in Figs. 5 and 6, the drive shaft 4 also actuates the pressure pump 9 through the medium of the previously mentioned eccentrics 5 and 6. The followers 7 and 8 upon the respective eccentrics 5 and 6 serve to reciprocate the main pumping piston 31 and the valve piston 30 respectively. The eccentric 6 is keyed directly to the drive shaft 4. Eccentric 5 is driven from eccentric 6 by means of suitable lost motion driving faces (not shown) on the eccentric 6 which are adapted to contact with the projection 10 on the eccentric 5. In other words, the valve piston driving eccentric 6 possesses a certain angular lag with respect to the pumping piston drive eccentric 5. The provision of the lost motion drive between the eccentrics 5 and 6 renders it possible to rotate the drive shaft 4 in either direction and still secure a pumping operation. In this manner the lubricating system may be readily installed to a driving mechanism without necessitating the trouble of making sure that the drive shaft 4 is always rotated in a certain direction, since rotation in either direction will equally well operate both the pump and the timing mechanism.

The pumping piston 31 reciprocates in a cylinder which is in communication with the lubricant reservoir 1 through the passage 32. A passage 33 connects the pumping cylinder with the valve cylinder. Another passageway 34 leads to the conduit 34' which in turn leads to the control valve 3. A port 35 leads from a point in the passage 33 through the relief passage 38 back to the lubricant reservoir. A relief valve consisting of the plunger 36 mounted against the compression of the coil spring 37 serves as a means for determining the pressure at which lubricant will be permitted to flow back through the relief passage 38. For the purpose of accommodating excessive relief pressures, a second passageway 39 is provided which also leads back to the lubricant reservoir 1.

The relief valve 36 has been inserted in the pressure pump for the purpose of preventing a hammering action and undue strain upon the parts. Its presence is of particular benefit when lubricants of heavier viscosity such as grease are used in the system. There is a minute period of time when the valve piston 30 will still close the lower end of the passage 33, and when the working piston 31 will be on its compression stroke. During this fraction of time, it will be seen that the lubricant in the passage 33 will be compressed and subjected to compressive action alone. It is at this point that the relief valve 36 is intended to function.

*Control valve*

The delivery end of the conduit 34' from the pressure pump leads to passage 41, and the conduit 40 connects the conduit 34' to the passage 42 leading to cylinder 44.

The main control valve consists of a piston type valve 43 which is adapted to reciprocate in the cylinder 44. The piston valve 43 includes the medial enlarged portions 45 and 46 which are adapted to open and close the ends of the passages 41 and 42 respectively; it also includes enlarged end portions 47 and 48, the function of which will be presently described.

Immediately opposite the ends of the passages 41 and 42 are found the passages 49 and 50 which lead to the secondary piston valve chamber 51 and thence to the lubricant distribution line outlet conduits 52 and 53 respectively. A second piston valve 54 is adapted to reciprocate within the cylinder 51.

To trace the flow of the lubricant through the last described apparatus, and referring to Fig. 6, it will be seen that the lubricant is delivered under pressure through the conduit 34' from the pressure pump, to the conduit 40, through the passage 42, through the passage 50, to the distribution line outlet 53. After passage through the distribution line and operating the various line valves (the latter not being shown) the lubricant returns through the conduit 55 to the passage 56 and into the left hand end of the second valve cylinder 51. When the lubricant has built up a sufficient pressure to move the secondary piston valve 54 from its position in Fig. 6 to that shown in Fig. 5, it will then enter the passage 57 and out from the control valve body to the lubricant reservoir through the conduit 58. In this manner, it will be seen that the lubricant has completed its cycle of flow through one of the distribution lines. When the timing mechanism operates to move the connecting arm 22 and main control valve 43 in a right hand direction with respect to Figs. 5 and 6, an analogous lubricant flow will occur through the other of the dual distribution lines.

Tracing the flow of lubricant through the second distribution line: Lubricant is supplied under pressure through the inlet 41 through the passage 49 to the distribution line conduit 52 and thence through the distribution line; passing through the distribution line and operating the line valves, the lubricant returns through the conduit 59 to the passage 60, through the secondary valve cylinder 51 to the passage 61 and thence by way of the conduit 62 back to the lubricant reservoir 1.

For the purpose of more conveniently comprehending the drawings, the dual distribution lines have been designated as lines 1 and 2 respectively and legends denoting the connecting points of these lines have been applied to Figs. 5 and 6.

As has been previously indicated, it is further desirable to impart a resistance to the return flow of the lubricant from the distribution line. This object has been accomplished by means of the mechanism best shown in Figs. 3 and 4. At the point of return of the lubricant from the distribution line into each end of the secondary valve cylinder 51, it will be seen that the lubricant is impeded from further flow by the ends of the piston valve 54. Hence a resistance is imparted to the movement of the piston valve which in turn tends to build up the pressure in the return lines.

Such resistance is effected through the medium of the following structure: A gear rack 63 on the medial portion of the piston valve 54 is engaged by the teeth of the gear segment 64. The gear segment 64 is mounted upon a rock shaft 65 which leads out through the valve body 3 and has connected upon its outer end the lever arm 66. Tension spring 67 connects the end of the lever arm 66 to the clevis 68 on the end of the bolt 69 which is in turn threaded through the housing of the valve body 3. An adjusting nut 70 engages with the outer end of the bolt 69 and serves as a means for variably regulating the tension of the spring 67. The clevis 68 and bolt 69, or in effect the fixed end of the spring 67 is in alignment with the axis of the shaft 65 and the end of the arm 66 when the piston valve 54 is in its medial position in its cylinder. In this manner it will be seen that the above-described means for impeding the movement of the piston valve 54 is in effect a toggle mechanism so designed as to retard the initial movement of the piston valve 54 away from its extremely left or right hand position and to accelerate its final movement.

As shown in Fig. 3, an indicator rod 71 extending through the exterior of the valve body 3 and connected on its inner end with the right hand end of the main piston valve 43 by means of a cross pin 73 may be provided. A packing gland indicated generally by the numeral 72 slidably seals the indicator rod in its movement. Hence the rod 71 serves as a means for indicating on the exterior of the mechanism, the position of the main piston valve 43.

It should also be noted that means have been provided for returning excess lubricant under pressure from the feed end of the distribution lines, namely, the conduits 52 and 53, to the lubricant reservoir when the latter have reached a predetermined pressure. Referring to Fig. 5, it will be seen that the return pressure of the lubricant through conduit 55 has forced the piston valve 54 to its right hand position, thereby placing the passages 50 and 61 in communication with each other through the valve cylinder 51. That is to say, when the demands of the distribution line and line valves have been satisfied and the return pressure in conduit 55 has overcome the resistance of the piston valve 54, the excess lubricant which is still circulated through the outlet conduit 53 may return to the reservoir by either of two passages, namely through passages 55, 56, 57 and 58, or it may follow a course of much shorter length and less restriction through the passages 50, 61 and 62. Reference to Fig. 5 will readily disclose these two last mentioned courses of lubricant flow. Such means for providing a return flow of excess lubricant from both the feed and return end of the distribution lines serves two purposes. First, the short passage to the reservoir offers a minimum restriction to flow and consequently lessens the load on the pump during the idling period incidental to the flow reversing piston 43 assuming its other position; and, second, when grease is used as a lubricant it is not desirable to have any dead ended passages since many greases when subjected to repeat pressure application break down, leaving a hard soap deposit, quite likely to clog the system. For this reason, the provision by means of passages 56, 57 and 58, for return of lubricant to the reservoir from the end of the pressure control piston chamber 51, is essential as it affords means of frequently and automatically flushing the pressure control chambers.

Also, when grease is used as a lubricant, where the lines supplying the discharge valves are long, the high viscosity of the lubricant creates a considerable pressure drop along the supply line. After the application of pressure to a long line, if the pressure were relieved at one end of the line only, a residual pressure of considerable magnitude might persist at the other end of the line indefinitely. It is therefore desirable to relieve both ends of the supply line after the requirements of this system have been met, as is done in the construction disclosed.

As the main piston valve 43 is moved from its left to right hand position with respect to Figs. 5 and 6, there would normally occur a point at which both the passages 41 and 42 would be completely closed, thereby producing a surge of back pressure in the conduit 34'. However, to avoid such a disadvantage, the enlarged portions 45 and 46 of the piston valve 43 are so constructed that the right hand end of the enlarged portion 46 will not completely close the passage 42 until the passage 41 is partially opened by the piston 45. In this manner, the full normal flow from the pump is permitted to flow through the pressure supply line 34' at all times. It should also be noted that the enlarged right hand end 48 of the main piston valve 43 has occupied the position as indicated by the dotted lines in Fig. 5 whereby the passage 75 to the reservoir return line is open. A similar passage 76 is provided for coaction with the piston 47 on the other end of the piston valve 43. The passages 77 and 78 on the extreme ends of valve cylinder 44 serve the function of permitting the unrestricted flow of lubricant which is displaced in the valve cylinder 44 upon movement of the piston 43, back to the reservoir, in order to obviate resistance to such movement.

Passages 75 and 76 are for the purpose of relieving the tendency for wire drawing when the shoulders 45 and 46 are passing their respective passages 41 and 42. That is to say when the pump is operating at a fairly high rate of speed, producing a resultant high rate of lubricant flow, and when there are but a few discharge valves connected to the system, whereby the proportion of lubricant flowing through the system will be relatively high as compared to the amount of lubricant that is fed to the bearings, then the passages 75 and 76 best serve their purpose. This point may be more specifically illustrated by reference to Fig. 5 where the main piston 43 as indicated in dotted lines has assumed a position towards the right. Shoulder 46 is about to close passage 42. Shoulder 45 is just beginning to open passage 41. Now, if the rate of flow of lubricant is great and the discharge capacity of the system is slight, there is the opportunity that a pressure will be built up in return line 59 against the right hand end of piston 54, if it were not for the provision of passage 76. When shoulder 45 starts to uncover passage 41, shoulder 47 has not entirely closed off passage 76 and consequently the pressure may be relieved to the reservoir at this point.

In conclusion, it should be noted that throughout the design and construction of the control valve as a whole, that it has been sought to maintain a constant flow of lubricant regardless of the normal functioning of the several valves and ports, or the discharge capacity of the valves served by the mechanism, in order that a mechanism might be provided, to permit of a sufficiently high rate of pump delivery to minimize the hazard of leakage in the rather extensive high pressure system served by the mechanism. It may be noted in this connection that if a definite rate of leakage for a definie pressure be characteristic of the lubricating system served, the seriousness of this leakage increases in importance as the rate of flow through the system is reduced. The construction disclosed permits the constant use of a relatively high rate of flow, thereby minimizing the seriousness of leakage losses.

In further conclusion, it should also be mentioned that the adjustable means for varying the rate of operation of the timing mechanism is of particular advantage when the lubricating system is installed upon machinery subject to overnight or periodical shut-downs. In such a case it is desirable that the bearings in such machinery be rapidly lubricated before the machine is started. Or in other words, that the rate of lubrication during the initial operation of a previously shut-down machine be greatly increased as compared to its normal rate of lubrication. Thus, by mere manipulation of the timing mechanism control knobs 30', the operator may quickly and easily increase the rate of operation of the timing mechanism and correspondingly effect a discharge of the lubricating system in a comparatively short time.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a lubricating system, the combination of a lubricant reservoir, dual feed and return conduits, pressure means for supplying lubricant from said reservoir to said conduits, a control valve for alternately directing the flow of lubricant in said conduits, and timing means directly connected to and for actuating said control valve.

2. In a lubricating system, the combination of a lubricant reservoir, dual feed and return conduits, pressure means for supplying lubricant from said reservoir to said conduits, a control valve for alternately directing the flow of lubricant in said conduits, timing means directly connected to and for actuating said control valve, and regulating means for adjustably varying the period of actuation of said timing means.

3. In a lubricating system, the combination of a lubricant reservoir, dual feed and return conduits, pressure means for supplying lubricant from said reservoir to said conduits, a control valve for alternately directing the flow of lubricant in said conduits, a shaft for driving said pressure means, an eccentric carried by said shaft, a follower for said eccentric, said follower being connected to said control valve, and means for adjustably regulating the rate of rotation of said eccentric with respect to that of said shaft.

4. In a lubricating system, the combination of a lubricant reservoir, dual feed and return conduits, pressure means for supplying lubricant from said reservoir to said conduits, a control valve for alternately directing the flow of lubricant in said conduits, a shaft for driving said pressure means, a series of eccentrics mounted on said shaft, pawl and ratchet means carried by said eccentrics and adapted to rotate each subsequent eccentric in said series, the first of said series of eccentrics being rotated by said shaft, the last of said series of eccentrics being adapted to actuate said control valve.

5. In a lubricating system, the combination of a lubricant reservoir, dual feed and return conduits, pressure means for supplying lubricant from said reservoir to said conduits, a control valve for alternately directing the flow of lubricant in said conduits, a shaft for driving said pressure means, a series of eccentrics mounted on said shaft, pawl and ratchet means carried by said eccentrics and adapted to rotate each subsequent eccentric in said series, the first of said series of eccentrics being rotated by said shaft, the last of said series of eccentrics being adapted to actuate said control valve, and means for variably regulating the extent of engagement of each of said pawls with their respective ratchets.

6. In a lubricating system, the combination of a lubricant reservoir, dual feed and return conduits, pressure pump means for supplying lubricant from said reservoir to said conduits, a shaft for driving said pressure pump, said pump being operable upon either direction of rotation of said shaft, and means for alternately directing the flow of lubricant in said conduits, said flow directing means being also actuated by said shaft.

7. In a lubricating system, the combination of a pair of dual feed and return conduits, a primary valve connected to said conduits for alternately directing the flow of lubricant to said feed conduits, a secondary valve being initially movable under pressure generated in said return conduits, said secondary valve also being adapted to relieve such return conduit pressure and the feed conduit pressure after a predetermined distance of travel of said secondary valve, and mechanism connected to said secondary valve adapted to retard the initial movement of said valve and to accelerate its final movement.

8. In a lubricating system, the combination of a pair of dual feed and return conduits, a primary valve connected to said conduits for alternately directing the flow of lubricant to said feed conduits, a secondary valve being initially movable under pressure generated in said return conduits, said secondary valve also being adapted to relieve such return conduit pressure and the feed conduit pressure after a predetermined distance of travel of said secondary valve, and toggle mechanism connected to said secondary valve adapted to retard the initial movement of said secondary valve and to accelerate its final movement.

9. In a lubricating system, the combination of a pair of dual feed and return conduits, a primary valve connected to said conduits for alternately directing the flow of lubricant to said feed conduits, a secondary valve being initially movable under pressure generated in said return conduits, said secondary valve also being adapted to relieve such return conduit pressure and the feed conduit pressure after a predetermined distance of travel of said secondary valve, toggle mechanism connected to said secondary valve adapted to retard the initial movement of said secondary valve and to accelerate its final movement, and means for variably regulating the resistance of said toggle mechanism.

10. In a lubricating system, the combination of a pair of dual feed and return conduits, a primary valve connected to said conduits for alternately directing the flow of lubricant to said feed conduits, a secondary valve being initially movable under pressure generated in said return conduits, said secondary valve also being adapted to relieve such return conduit pressure and the feed conduit pressure after a predetermined distance of travel of said secondary valve, a lever member having one end connected to said secondary valve, and a resilient member connected to the other end of said lever member, the end of said resilient member being fixed at a point aligned with the fulcrum point and end of said lever member.

11. In a lubricating system, the combination of a pair of dual feed and return conduits, a piston valve connected to said conduits for alternately directing the flow of lubricant to said feed conduits, a secondary valve being initially movable under pressure generated in said return conduits, said secondary valve also being adapted to relieve such return conduit pressure and the feed conduit pressure after a predetermined distance of travel of said secondary valve, a lever member having one end connected to said secondary valve, a resilient member connected to the other end of said lever member, the end of said resilient member being fixed at a point aligned with the fulcrum point and end of said lever member, and means for adjustably regulating the tension of said resilient member.

12. In a lubricating system, the combination of a lubricant reservoir, dual feed conduits, pressure means for supplying lubricant from said reservoir to said conduits, a valve for alternately directing the flow of lubricant to each of said feed conduits, dual return conduits connecting said feed conduits to said reservoir, and a second valve for initially closing said return conduits to said reservoir and for automatically directing the return of excess lubricant not introduced to and not required by said feed conduits from said second valve to said reservoir.

13. In a lubricating system, the combination of a lubricant reservoir, dual feed conduits, pressure means for supplying lubricant from said reservoir to said conduits, a valve for alternately directing the flow of lubricant to each of said feed conduits, dual return conduits connecting said feed conduits to said reservoir, and a second valve for initially closing said return conduits to said reservoir and for automatically directing the return of excess lubricant not introduced to and not required by said feed conduits from said second valve to said reservoir, said second valve also being adapted to direct additional excess lubricant from said return conduits to said reservoir.

14. In a lubricating system, the combination of a lubricant reservoir, dual feed conduits, pressure means for supplying lubricant from said reservoir to said conduits, a valve for alternately directing the flow of lubricant to each of said feed conduits, dual return conduits connecting said feed conduits to said reservoir, and a second valve for initially closing said return conduits to said reservoir and for automatically directing the return of excess lubricant not introduced to and not required by said feed conduits from said second valve to said reservoir, and means for retarding the movement of said second valve against the force exerted against said second valve by the lubricant under pressure in said return conduits.

GEORGE H. ACKER.